United States Patent Office 3,351,609
Patented Nov. 7, 1967

3,351,609
ARYL-β-HYDROXYETHYL ETHERS AS ANTIOZONANTS
Marshall R. Brimer and William T. Tucker, Kingsport, Tenn., assignors to Eastman Kodak Company, Rochester, N.Y., a corporation of New Jersey
No Drawing. Filed Mar. 13, 1964, Ser. No. 351,860
8 Claims. (Cl. 260—45.9)

ABSTRACT OF THE DISCLOSURE

A rubber composition comprising a natural or synthetic rubber containing an antiozonant amount of a hydroxyethylated phenol of the following formula:

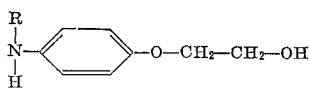

wherein R may be $C_1$–$C_{18}$ alkyl and substituted and unsubstituted alkyl-aryl.

---

This invention relates to inhibiting the deteriorating effects of ozone on natural and synthetic rubbers and rubber compositions. More particularly, the invention relates to the employment as antiozonants for this purpose of aryl β-hydroxyethyl ethers of the hydroxyethylated substituted aminophenol type exemplified by N-1-methyl heptyl-p-(β-hydroxyethoxy) aniline and N - 4 - methyl phenyl-p-(β-hydroxyethoxy) aniline.

Even though ozone is present in air in concentrations of only a few parts per hundred million parts of air, it is well known that such atmospheric ozone causes the deterioration of rubber compositions and rubber goods, notably dynamically or statically stressed rubber goods such as rubber tires. Such deterioration manifests itself by cracking of the rubber which is sometimes severe enough to produce deep cracks in, and actual failure of, rubber products, particularly under conditions of stretching or elongation in ordinary usage. The problem has been noticeably present when rubber tires are stored or used in areas where ozone is present in relatively high concentrations in the atmosphere.

In recent years, various antioxonants have been employed which, when incorporated into the rubber receipes from which the finished rubber goods are made, serve to inhibit this effect. Among the most commonly used and commercially successful antiozonants for natural and synthetic rubber are the N,N'-disubstituted p-phenylenediamines. Included among these are the alkyl and phenyl substituted compounds such as N,N' - dioctyl - p - phenylenediamine and N - isopropyl - N' - phenyl-p-phenylenediamine. Other examples of substituted phenylenediamines are the N,N' - di(hydroxyalkyl)-p- and o-phenylenediamines in which the alkyl groups each contain 1–20 carbon atoms, such as N,N' - dihydroxyhexyl-p-phenylenediamine, have been described and claimed for this purpose in U.S. Patent 2,929,796. Reaction products of sulfur chlorides and N,N'-dialkyl-p-phenylenediamines in which each alkyl group contains 1–12 carbon atoms such as N,N' - disecbutyl-p-phenylenediamine are disclosed in U.S. Patent 2,991,271. Certain phenols having an alkoxy group of 1–6 carbon atoms in the 2-position, an alkyl group of 1–6 carbon atoms in the 4-position and a chlorine atom in the 5- and 6-positions of the benzene ring, such as 2-methoxy - 4 - methyl - 5,6 - dichlorophenol have also been suggested as antiozonants for natural and synthetic rubbers in U.S. Patent 2,984,694. Other antiozonant phenol derivatives of the 2,6 - dialkoxy-4 alkyl-phenol type in which the phenol contains from 1–4 carbon atoms in the alkyl group such as 2,6 - dimethoxy-4n-propylphenol are disclosed in British Patent 810,529. Still another class of compounds suggested as antiozonants are certain substituted urea compounds having the structure

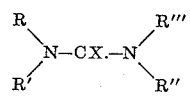

where X is sulfur or oxygen and R, R', R" and R'" are hydrogen or hydrocarbon groups, at least two of them beeing alicyclic and exemplified by 1,1 - dicyclohexyl-3-phenylurea.

The present invention has as its principal object to provide an effective antiozonant for natural and synthetic rubbers.

Another object is to provide improved natural and synthetic rubber compositions containing the improved antiozonant of our invention.

Other objects will appear hereinafter.

These objects are accomplished by the following invention which, in its broader aspects, is based upon the discovery that the hydroxy ethyl aryl ethers described below have a high level of antiozonant potency when incorporated in natural or synthetic rubber stocks. This is a surprising discovery since aryl ethers in general, typified by hydroquinone dimethyl ether, are inert and have found few, if any, uses as industrial stabilizers in the rubber industry. The compounds of the invention may be defined as hydroxyethylated substituted aminophenols and may be represented by the structural formula

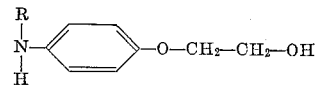

wherein R is a substituent selected from the group consisting of alkyl groups containing from 1–18 carbon atoms such as methyl, ethyl, propyl, isopropyl, butyl, isobutyl, etc., and substituted and unsubstituted alkyl-aryl groups including tolyl, xylyl, etc., and typified by compounds such as N - 1 - methyl-heptyl - p - (β-hydroxyethoxy) aniline having the structural formula

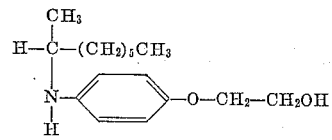

and N - 4 - methyl-phenyl-p-(β-hydroxyethoxy) aniline having the structural formula

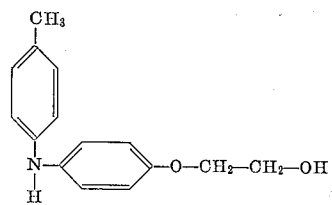

and N - isopropyl - p - (β-hydroxyethoxy) aniline, N-phenyl - p - (β-hydroxyethoxy) aniline, N - 2 - methyl phenyl - p - (β-hydroxyethoxy) aniline, N - dimethyl-phenyl - p - (β-hydroxyethoxy) aniline, N - 1,4-dimethyl-pentyl-p-(β-hydroxyethoxy) aniline and others.

In the following examples and description we have set forth several of the preferred embodiments of our invention but they are included merely for purposes of illustration and not as a limitation thereof.

PREPARATION OF ANTIOZONANTS

As indicated above, compounds we have found to have particular efficacy as antiozonants for natural and synthetic rubbers are N-1-methyl heptyl-p-(β-hydroxyethoxy) aniline and N-4-methyl phenyl-p-(β-hydroxyethoxy) aniline. These compounds may be prepared as described below.

*(1) Preparation of N-1-methyl heptyl-p-(β-hydroxyethoxy) aniline*

The chemical reactions are as follows:

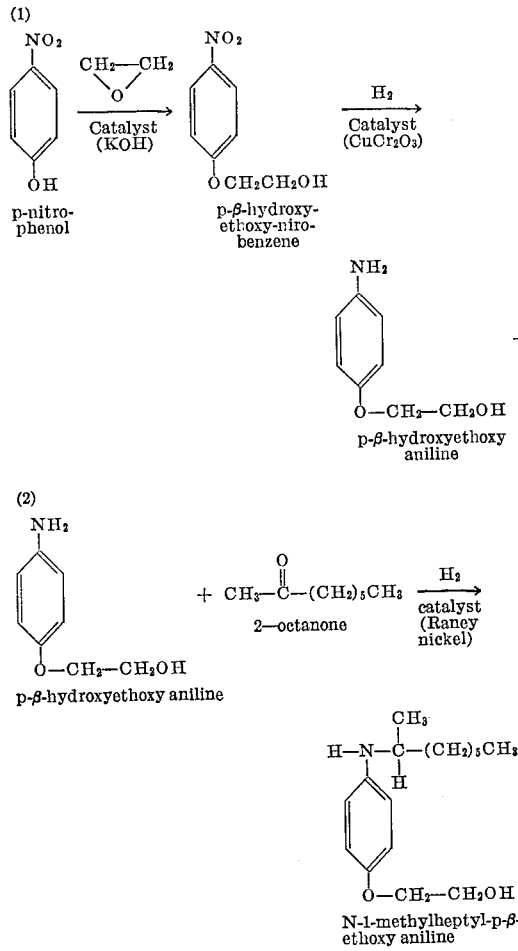

*Preparation Procedure (Equation 2 above)*

70.0 grams (0.46 mol) p-(β-hydroxyethoxy) aniline, 250.0 grams (1.95 mols) 2-octanone and 80.0 grams (1.02 mols) benzene were charged to a one-liter three-necked flask equipped with an agitator, thermometer and a reflux condenser fitted with a Dean-Stark tube. The batch was heated to reflux temperature (approximately 100° C. pot temperature) and the water formed from the Schiff base reaction was collected in the Dean-Stark tube until a total of 9.0 cc. (0.5 mol) had been obtained. The batch was then transferred to a pressure vessel with 10.0 grams of copper chromite. This pressure vessel was equipped with an efficient agitator and a source of hydrogen. The vessel was closed and purged twice with hydrogen. The pressure was raised to 900 p.s.i. with hydrogen and the temperature was raised to 175–180° C. and maintained for two and one-half hours. The hydrogen was replenished as used, maintaining a pressure of 900–1100 p.s.i. The autoclave was cooled to room temperature and vented. The batch was filtered to remove the catalyst and the low boiling components removed under reduced pressure. One hundred and forty-five grams of crude N-1-methylheptyl-p-(β-hydroxyethoxy) aniline was obtained. This crude was vacuum distilled under a pressure of 0.5 mm. yielding 28.7 grams of a fore cut distilling at 110–140° C. and 108.0 grams of a N-1-methyl heptyl-p-(β-hydroxyethoxy) aniline distilling at 160–175° C. Five and three-tenths grams of residue remained behind.

*(2) Preparation of N-4-methylphenyl-p-(β-hydroxyethoxy) aniline*

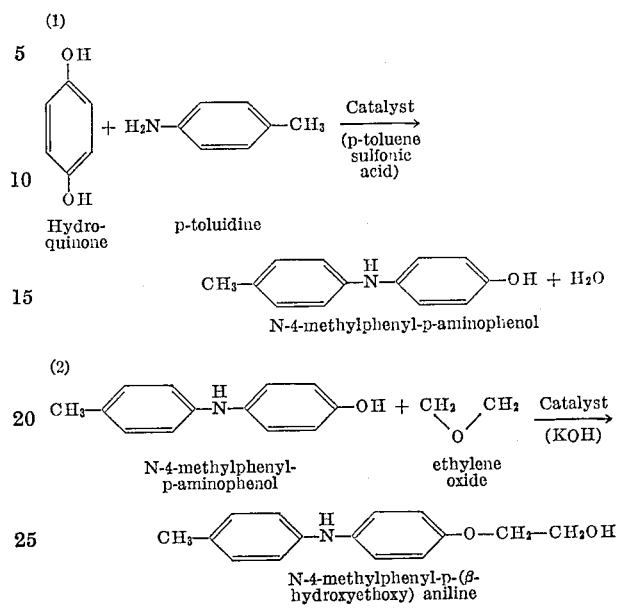

*Preparation Procedure (Equation 2 above)*

99.5 grams (0.5 mol) N-4-methylphenyl-p-aminophenol, 150.0 grams (2.17 mol) isopropyl alcohol, 1.0 gram (0.01753 mol) potassium hydroxide and 22.0 grams (0.5 mol) ethylene oxide. The 4-methylphenyl-p-aminophenol, isopropyl alcohol and potassium hydroxide were charged to a pressure vessel equipped with an efficient agitator. The autoclave was purged with nitrogen and the temperature raised to 125–130°. The addition of the ethylene oxide was started and pumped in over a fifteen-minute period and the temperature maintained for an additional hour. The autoclave was cooled to room temperature and vented. The batch was removed from the autoclave and stripped to remove the low-boiling components. The crude N-4-methylphenyl-p-(β-hydroxyethoxy) aniline was dissolved in 200 cc. of toluene and cooled and filtered. Seventy-six grams of this crystalline product [N-4-methylphenyl-p-(β-hydroxyethoxy) aniline] were obtained.

Our invention will be more readily understood from the following examples of uses of our new antiozonants which are typical of many specific industrial applications in the rubber industry.

TESTING OF ANTIOZONANTS

The antiozonants of our invention were tested by incorporating them in both natural and synthetic rubber formulations in antiozonant amounts which fall within the range of about 0.5 to about 10 percent by weight of the total composition. The formulations were in each instance prepared in sheet form by incorporating the antiozonant in the rubber formulation by mixing in a conventional mixer such as a Banbury mixer or equivalent device. The samples were then vulcanized in accordance with ASTM–D15–57T procedure. The rubber sheet material containing the antiozonant was in each instance then evaluated dynamically in an ozone cabinet as follows: dumbbell shaped specimens, Die "A" ASTM–D412–51T, were cut from the vulcanized rubber sheets prepared as described above and first prestretched at 100 percent elongation for 16 hours. The specimens were then mounted in clamps in a stretching apparatus in an ozone cabinet where they were subjected to the action of air containing 50±5 parts of ozone per hundred million parts of air while being elongated from 0 to 22 percent back to 0 thirty times a minute. The results obtained are expressed in the tables that follow in terms of hours until the first visible crack was observed on the surface of the specimens. The compositions tested to provide the data for the following examples have the compositions indicated below:

Natural rubber:

| | Parts by weight |
|---|---|
| Natural rubber smoked sheet | 100.00 |
| Carbon black (EPC-channel black) | 50.00 |
| Pine tar | 4.00 |
| Zinc oxide | 3.00 |
| Stearic acid | 2.50 |
| Benzothiazyl disulfide | 1.00 |
| Sulfur | 2.25 |
| Total | 162.75 |

Synthetic rubber (styrene-butadiene rubber):

| | Parts by weight |
|---|---|
| Styrene - butadiene rubber (ASTM – SBR 1500) | 100.00 |
| Carbon black (HAF–furnace black) | 50.00 |
| Naphthentic type process oil having an aniline point of 156° F., specific gravity of 0.9230 and an ASTM color of 2 (Circo Light Oil) | 3.50 |
| Saturated, polymerized petroleum hydrocarbon having a specific gravity in the range of 0.95–0.98 (Paraflex 2016) | 3.50 |
| Zinc oxide | 3.00 |
| Stearic acid | 1.50 |
| N-cyclohexyl-2-benzothiazole sulfenamide | 1.25 |
| Sulfur | 2.00 |
| Total | 164.75 |

EXAMPLE I

Employing the procedures described above the results obtained by subjecting both synthetic and natural rubbers having N-1-methyl heptyl-p-(β-hydroxyethoxy) aniline incorporated therein as an antiozonant to the abovementioned dynamic test were as follows:

| | Hours to First Visible Crack | |
|---|---|---|
| | Styrene-Butadiene Rubber (ASTM-SBR 1500) | Natural Rubber Smoked Sheet |
| Natural rubber smoked sheet control containing no antiozonant | | 8 |
| Styrene-Butadiene Rubber (ASTM-SBR 1500) control containing no antiozonant | 6 | |
| 0.5 pt. N-1-methylheptyl-p-(β-hydroxyethoxy) aniline | 16 | 7 |
| 1.0 pt. N-1-methylheptyl-p-(β-hydroxyethoxy) aniline | 31 | 15 |
| 2.0 pts. N-1-methylheptyl-p-(β-hydroxyethoxy) aniline | 39 | 24 |
| 3.0 pts. N-1-methylheptyl-p-(β-hydroxyethoxy) aniline | 61 | 54 |

EXAMPLE II

When N-1,4-dimethylpentyl-p-(β-hydroxyethoxy) aniline was employed as the antiozonant and tests carried out as in Example I, the results were as follows:

Hours to first visible crack natural rubber smoked sheet

| | |
|---|---|
| 1.0 pt. N-1,4-dimethylpentyl-p-(β-hydroxyethoxy) aniline | 15 |
| 2.0 pts. N-1,4-dimethylpentyl-p-(β-hydroxyethoxy) aniline | 24 |
| 3.0 pts. N-1,4-dimethylpentyl-p-(β-hydroxyethoxy) aniline | 32 |

EXAMPLE III

When N-isopropyl-p-(β-hydroxyethoxy) aniline was employed as the antiozonant and tests carried out as in Example I, the results were as follows:

Hours to first visible crack natural rubber smoked sheet

| | |
|---|---|
| 1.0 pt. N-isopropyl-p-(β-hydroxyethoxy) aniline | 16 |
| 2.0 pts. N-isopropyl-p-(β-hydroxyethoxy) aniline | 24 |
| 3.0 pts. N-isopropyl-p-(β-hydroxyethoxy) aniline | 28 |

EXAMPLE IV

When N-dimethylphenyl-p-(β-hydroxyethoxy) aniline was employed as the antiozonant and tests carried out as in Example I, the results were as follows:

Hours to first visible crack natural rubber smoked sheet

| | |
|---|---|
| 1.0 pt. N-dimethylphenyl-p-(β-hydroxyethoxy) aniline | 18 |
| 2.0 pts. N-dimethylphenyl-p-(β-hydroxyethoxy) aniline | 24 |
| 3.0 pts. N-dimethylphenyl-p-(β-hydroxyethoxy) aniline | 28 |

As indicated above, these compounds may be employed for the antiozonant treatment and stabilization of both natural and synthetic rubber, that is, any sulfur-vulcanizable elastomer subject to ozone attack, including natural rubbers, unsaturated synthetic elastomers such as copolymers of butadiene and styrene, polybutadiene type synthetic rubber, other diene vinyl copolymers such as copolymers of butadiene 1,3 and acrylonitrile and various other related elastomeric substances.

The antiozonant materials of our invention may be incorporated in a wide variety of natural and synthetic rubbers or rubber products such as those used for automobile tires and tubes, hose, belting, sheeting, rubber thread, rubberized fabrics and molded products. Incorporation of the antiozonant may be carried out in any suitable manner and at any stage of the preparation of the rubber composition in accordance with procedures well known in the rubber industry. As before stated, the concentration of the antiozonant employed in accordance with the invention may vary, depending on the particular natural or synthetic rubber composition treated, from about 0.5 to about 10 percent by weight of the total composition and, as a general average, a preferred range of 1–3 percent. Our antiozonants may also be used together with other additives usually incorporated in rubber compositions for specific purposes, such as antioxidants, accelerators, softeners, re-enforcing agents, waxes and the like, as is well known to the art to which this invention relates.

Although the invention has been described in considerable detail with particular reference to certain preferred embodiments thereof, variations and modifications can be effected within the spirit and scope of the invention as described hereinabove, and as defined in the appended claims.

We claim:
1. A rubber composition comprising:
   (A) a rubber selected from the class consisting of natural and synthetic rubbers which are subject to ozone degradation, and
   (B) an antiozonant amount of a hydroxyethylated substituted amino phenol having the structural formula

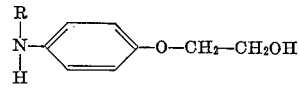

wherein R is ia substituent selected from the group consisting of alkyl groups containing from 1–18 carbon atoms phenyl, and lower alkyl substituted aryl groups.

2. A rubber composition comprising:
   (A) a rubber selected from the class consisting of natural and synthetic rubbers which are subject to ozone degradation, and (B) an antiozonant amount of N-1-methyl-heptyl-p-(β-hydroxyethoxy) aniline.

3. A rubber composition comprising:
(A) a rubber selected from the class consisting of natural and synthetic rubbers which are subject to ozone degradation, and
(B) an antiozonant amount of N-4-methyl-phenyl-p-(β-hydroxyethoxy) aniline.

4. A rubber composition according to claim 1 wherein the hydroxyethylated substituted aminophenol is N-isopropyl-p-(β-hydroxyethoxy)aniline.

5. A rubber composition according to claim 1 wherein the hydroxyethylated substituted aminophenol is N-phenyl-p-(β-hydroxyethoxy)aniline.

6. A rubber composition according to claim 1 wherein the hydroxyethylated substituted aminophenol is N-2-methylphenyl-p-(β-hydroxyethoxy)aniline.

7. A rubber composition according to claim 1 wherein the hydroxyethylated substituted aminophenol is N-dimethylphenyl-p-(β-hydroxyethoxy)aniline.

8. A rubber composition according to claim 1 wherein the hydroxyethylated substituted aminophenol is N-1-,4-dimethylpentyl-p-(β-hydroxyethoxy)aniline.

References Cited
FOREIGN PATENTS 857,628  1/1961  Great Britain.

DONALD E. CZAJA, *Primary Examiner.*

V. P. HOKE, *Assistant Examiner.*